United States Patent
Hamana et al.

(10) Patent No.: US 6,910,778 B2
(45) Date of Patent: Jun. 28, 2005

(54) PRESENTATION SYSTEM USING LASER POINTER

(75) Inventors: Akinori Hamana, Saitama (JP); Junichi Yokoyama, Saitama (JP)

(73) Assignee: Fujinon Corporation, Saitama (JP)

( * ) Notice: Subject to any disclaimer, the term of this patent is extended or adjusted under 35 U.S.C. 154(b) by 310 days.

(21) Appl. No.: 10/375,068

(22) Filed: Feb. 28, 2003

(65) Prior Publication Data

US 2003/0132912 A1 Jul. 17, 2003

Related U.S. Application Data

(63) Continuation-in-part of application No. 10/254,794, filed on Sep. 26, 2002, now abandoned.

(30) Foreign Application Priority Data

Sep. 28, 2001 (JP) ........................................ 2001-299245
Jun. 25, 2002 (JP) ........................................ 2002-184327

(51) Int. Cl.$^7$ ............................ G03B 21/00; G09G 5/08
(52) U.S. Cl. .................................... 353/42; 345/158
(58) Field of Search ............................. 353/42; 345/157, 345/158, 163, 169, 180, 182, 183; 359/142, 143; 396/106, 107

(56) References Cited

U.S. PATENT DOCUMENTS 6,417,840 B1 * 7/2002 Daniels ...................... 345/158
6,460,999 B1 * 10/2002 Suzuki ......................... 353/79
6,698,897 B2 * 3/2004 Hamana et al. ............... 353/42
6,766,066 B2 * 7/2004 Kitazawa .................... 382/291

FOREIGN PATENT DOCUMENTS

| JP | B2 2622620 | * | 4/1997 | ........... G06F/3/033 |
| JP | A 11-85395 | * | 3/1999 | ........... G06F/3/033 |
| JP | A 11-143636 | * | 5/1999 | ........... G06F/3/033 |
| JP | B2 2977559 | * | 9/1999 | ........... G06F/3/033 |

* cited by examiner

Primary Examiner—Alan A. Mathews
Assistant Examiner—Melissa J Koval
(74) Attorney, Agent, or Firm—Oliff & Berridge, PLC

(57) ABSTRACT

A presentation system includes a screen device, a projecting device that projects a visible image onto the screen device, and a laser pointer operated by a user, that projects a laser beam onto the screen device. The laser pointer includes an infrared light emitting section and a laser beam emitting section. A projected image of the infrared light projected onto the screen is sensed by an infrared light sensing section. Movement direction and movement distance of the projected image and button click signal are converted into mouse data usable by computer. An image based on the mouse data from the computer is projected from a projector to the screen. A human body sensor which senses heat of human body existing in a projected direction of the laser beam is settled to supply a safe presentation system by controlling the projection of the laser beam in case this sensor is operated.

3 Claims, 3 Drawing Sheets

PRESENTATION SYSTEM USING LASER POINTER

This application is a continuation-in-part of U.S. Ser. No. 10/254,794 filed Sep. 26, 2002, now abondened.

BACKGROUND OF THE INVENTION

1. Field of the Invention

The present invention relates to a presentation system for making a presentation in a lecture, or the like, while pointing to an image displayed on a screen using a laser pointer. More particularly, the present invention relates to a system which enables mouse operation on the screen of a personal computer using a laser pointer, and also relates to a system which enables preventing discharge of laser beam against human body.

2. Description of the Related Art

When making a presentation in a lecture or the like using a liquid crystal projector, a laser pointer which projects a laser beam onto a screen and indicates a point of interest on the screen is often used. In recent years, presentations are often performed while projecting images on a display of a personal computer onto a screen by using a liquid crystal projector or the like. In these cases, a mouse, which is one of the input devices for the personal computer, is operated. In recent years, a system in which light such as infrared light is irradiated onto a screen instead of a laser pointer dangerous for eyes, the irradiated spot is picked up by image pickup device to operate the coordinate, and a point image is projected to the operated coordinate is suggested. Such pointing systems are disclosed in Japanese Patent No. 2622620, No. 2977559, Japanese Unexamined Patent Application Publication No. 85395/99, and No. 143636/99, and are well known.

Although the mouse is usually operated by the presenter and the mouse is connected to the personal computer, the mouse operation can be applied to the pointing system which are disclosed in the Publication mentioned above. However, in these past techniques, position of an irradiated spot of infrared light or the like on the screen can be picked up as an only one coordinate on the pickup picture. That is, because an absolute position of projected spot of infrared light is operated as a coordinate to project a point image to a screen according to the operated result, physical relationship between the image pickup device and the screen must be rigorously decided from the optical viewpoint to organize the system. That is to say, a screen image which is picked up by the image pickup device can be easily distorted into trapezoid shape due to a difference of distances, and several corrections are required to settle a coordinate on the screen. Therefore, it is supposed that optical device and electrical system or system soft may become complicated.

SUMMARY OF THE INVENTION

It is, therefore, an object of the present invention according to claim 1 is to provide a presentation system using a laser pointer in which components required for projection of a pointer mark can be realized easily and inexpensively. Furthermore, an object of the present invention according to claims 2 and 3 is to provide a safe presentation system in which projection of laser against human or against an object except a screen can be controlled.

The present invention provides a presentation system using a laser pointer, comprising: a screen device; a projecting device for projecting a visible image generated by a computer onto the screen device; and a laser pointer operated by a user, projecting a laser beam onto the screen device. The laser pointer comprising: an infrared light emitting device for emitting an infrared light approximately in the same direction as a projection direction of the laser beam; and a switching device for switching the mode between a laser pointer mode for projecting the laser beam and a mouse mode for emitting the infrared light from the infrared light emitting device. The presentation system further comprises: an infrared light sensing device for sensing a projected image of the infrared light emitted from the infrared light emitting device to the screen device; and a processing section for generating movement data consisting of a movement direction and a movement distance of the projected image of the infrared light sensed by the infrared light sensing device, and for supplying the movement data to the computer. The projecting device projects a visible image onto the screen device based on the movement data supplied from the computer.

According to the present invention, the switching device provided on the laser pointer can change the mode to the laser pointer mode to project a laser beam or to the mouse mode for a mouse operation. In the laser pointer mode, the laser beam is projected. By directing the laser beam toward the screen device, the laser beam is projected onto the screen device. In the mouse mode, the infrared light is emitted from the infrared light emitting device. If the laser pointer is directed toward the screen device in this state, the infrared light as an invisible image is projected onto the screen device. The movement of the projected image of the infrared light is detected by the infrared light sensing device which is disposed at an appropriate location and movement data about the movement direction and the movement distance of the projected image is supplied to the processing section. The processing section generates a mouse data based on the movement data and supplies the generated mouse data to the computer, and the computer generates the visible image based on the mouse data and supplies the visible image to the projecting device, to project to the screen device. That is, a pointer mark according to the movement of the laser pointer is projected from the projecting device onto the screen device in real time.

According to the present invention, unlike in conventional systems, the laser pointer set in the mouse mode is moved intuitively, in contrast to using a mouse or a joystick, whereby a mouse operation can be performed easily. The presenter can swiftly change the mode to the laser pointer mode or to the mouse mode using the switching device of the laser pointer. Therefore, restrictions necessitating that a personal computer be disposed near the presenter to perform the mouse operation and that the presenter not be away from the personal computer and the like do not exist. The freedom of the position and movement of the presenter is thereby improved. It is thus possible to give a smooth presentation.

Moreover, if a mouse image is to be formed, then the infrared light sensing device senses the projected image of infrared light, only the movement direction and movement distance of the projected image are converted, and a mouse data is generated instead of operating the absolute position of the projected image of the infrared light as coordinates of the infrared light and projecting the mouse image onto the screen device from the operation result. That is, the projected image of infrared light onto the screen is relatively grasped to generate the coordinate, the component device of the system and the program of the processing section are not required to be complicated, making it possible to minimize cost. The mouse operation by the presenter is performed by the presenter adjusting the movement of the pointer mark to a desired location while viewing the pointer mark projected onto the screen device.

According to the present invention, as an additional constitution, the system further comprises: a human body sensor for sensing heat emitted from a human body present in the projection direction of the laser beam from the laser pointer; and a laser beam control device for controlling the projection of the laser beam projected from the laser pointer when the human body sensor operates.

With this constitution, if a person is present in the projection direction of the laser beam, the presence of the person is sensed by the human body sensor and the projection of the laser beam is restricted by the laser beam control device. The restriction of the projection of the laser beam in this case causes the device to stop projecting the laser beam or to reduce the intensity of the laser beam to a harmless level. This constitution enables avoiding the danger of projecting laser beam onto an eye in the laser pointer mode. The human body sensor may be provided on, for example, the laser pointer, or it may be provided on the screen device, the projecting device, or the like. As the human body sensor, a sensor which detects an infrared ray emitted from a human body may be appropriately employed.

Furthermore, as device for avoiding the risk of the laser beam, the following constitution, in addition to those stated above, may be provided. That is, the presentation system further comprises: an infrared light projecting device for projecting infrared light over approximately the entire surface of the screen device. The laser pointer comprises: an infrared light receiving section for receiving the infrared light oriented in the same direction as the projection direction of the laser beam, projected from the infrared light projecting device and reflected by the screen device; and a laser beam control device for projecting the laser beam only when the infrared light receiving section receives the infrared light.

With this constitution, while the laser pointer is directed toward the screen device, the infrared light receiving section provided on the laser pointer receives the infrared light reflected by the screen device. At this time, laser beam is projected from the laser pointer and the laser beam is projected onto the screen device. If the direction of the laser pointer is away from the screen device, the infrared light receiving section does not receive the infrared light reflected by the screen device and no laser beam is projected. That is, the laser beam is projected only when the laser pointer is directed toward the screen device. This constitution allows the danger of projecting a laser beam onto an eye in the laser pointer mode to be avoided.

DESCRIPTION OF THE PREFERRED EMBODIMENTS

The embodiments of the present invention will be described hereinafter with reference to the drawings.

(1) First Embodiment

Figure 1:
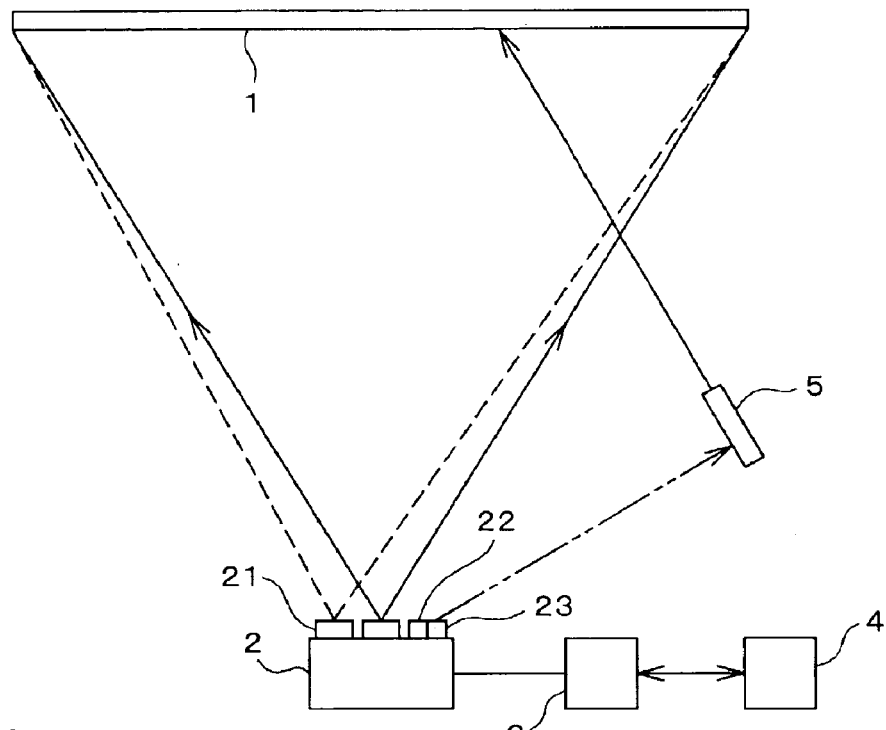
FIG. 1 is a conceptual view of a system in the first embodiment according to the present invention.

FIG. 1 schematically shows the entire system in the first embodiment according to the present invention. In FIG. 1, reference symbol 1 denotes a screen (screen device), 2 denotes a liquid crystal projector (projecting device) for projecting a liquid crystal image onto the screen 1, 3 denotes an image processing section (a processing section), 4 denotes a personal computer (computer), and 5 denotes a laser pointer held by a presenter. A visible image which is generated by the personal computer 4 is projected onto the screen 1 by the liquid crystal projector 2.

Figure 2:
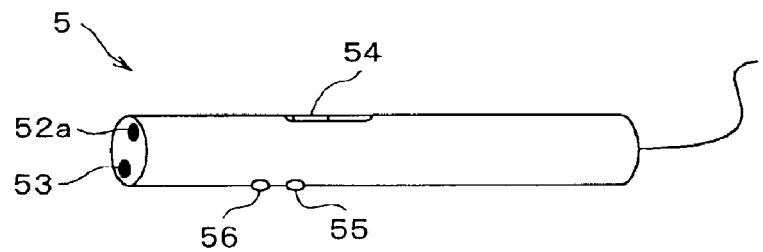
FIG. 2 is a perspective view of a laser pointer in the first embodiment according to the present invention.
Figure 3:
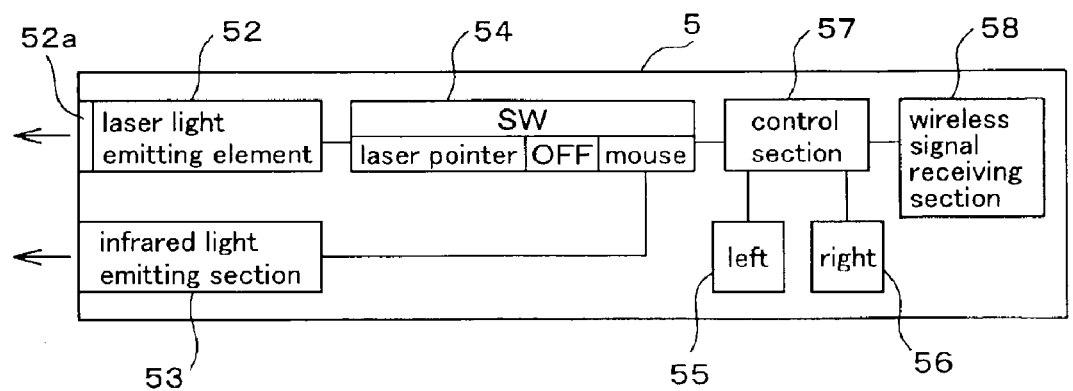
FIG. 3 is a block diagram showing the configuration of the laser pointer in the first embodiment according to the present invention.

FIG. 2 shows the appearance of the laser pointer 5. FIG. 3 is a block diagram showing the configuration of the laser pointer 5. This laser pointer 5 includes a laser beam emitting element 52, a laser beam projection section 52a and an infrared light emitting section (infrared light emitting device) 53. The light emitting direction of infrared light from the infrared light emitting section 53 is set to be approximately the same as the projection direction of a laser beam projected from the laser beam projection section 52a. The wavelength of the infrared light emitted from the infrared light emitting section 53 is, for example, about 850 to 950 nm, which wavelength greatly differs from that of infrared light of about 10 $\grave{1}$ m emitted by the human body.

As shown in FIG. 3, the laser pointer 5 is equipped with a switch (switching device) 54 switching over from a presently used mode between a laser pointer mode and a mouse mode with an OFF position located between the positions of these modes. The tip end of the laser pointer 5 is directed to the screen 1 and the switch 54 is changed over from OFF to the laser pointer mode (turned on), whereby a laser beam is projected from the projection section 52a of the laser beam emitting element 52 onto the screen 1. On the other hand, if the switch 54 is changed to the mouse mode, the laser pointer 5 can be used in place of a mouse, as will be described later, while stopping the laser beam emitting element 52. In addition, the laser pointer 5 is equipped with a left button 55 and a right button 56 which are used in the mouse mode. A mode change signal from the switch 54 and operation signals from the respective buttons 55 and 56 are supplied to a control section (laser beam control device) 57. Furthermore, the laser pointer 5 is equipped with a wireless signal receiving section 58 which receives a driving stop signal of the laser beam emitting element 52 mentioned below. When the wireless signal receiving section 58 receives the signal, the control section 57 stops driving of the laser beam emitting element 52.

As shown in FIG. 1, the liquid crystal projector 2 is equipped with an infrared light sensing section (infrared light sensing device) 21 which photographs the projected image of infrared light emitted from the infrared light emitting section 53 of the laser pointer 5 projected onto the screen 1. This infrared light sensing section 21 consists of an image pickup device of a CCD, PSD, multi-divided type photo diode (such as four divided type), or the like and senses the center of the projected image of the infrared light. The infrared light sensing section 21 senses the movement of the projected image of the infrared light on the screen 1 if the laser pointer 5 is moved toward the screen 1, the switch 54 of the laser pointer 5 is set at the mouse mode, the projected image on the screen 1 is moved for required extent, and then the switch 54 is turned off. Movement data on the movement direction and the movement distance of the center of the projected image of the infrared light on the screen 1 sensed by the infrared light sensing section 21 is supplied to the image processing section 3. The image processing section 3 generates a mouse data based on the movement data and supplies to the personal computer 4. The personal computer 4 generates a visible image based on the mouse data, and supplies to the liquid crystal projector 2. As a result, a pointer mark moves on the screen 1 depending on the movement of the laser pointer 5.

Furthermore, by performing the same operation as a conventional mouse operation (clicking) while appropriately depressing the left and right buttons 55 and 56 of the laser pointer 5 in the mouse mode, it is possible to execute various commands (such as a range designation command, an image scrolling command, and a page turning command) on the visible image. It should be noted that in the case of moving the pointer mark as mentioned above and in the case of clicking of buttons 55 and 56, wavelengths of infrared light emitted from the infrared emitting section 53 are settled different each other and these infrared light having different wavelengths are both sensed in the infrared light sensing section 21 in the mouse mode. In the clicking operation by buttons 55 and 56, the button operating signals based on each infrared lights are transmitted from the infrared light sensing section 21 to the image processing section 3, the image processing section 3 converts the button operating signals into the mouse data and supplies to the personal computer 4, and the personal computer 4 generates the visible image based on the mouse data and supplies to the liquid crystal projector 2.

Furthermore, as shown in FIG. 1, the liquid crystal projector 2 is equipped with a human body sensor 22. This human body sensor 22 senses heat emitted from a human body in proximity to the liquid crystal projector 2. Specifically, the sensor 22 receives an infrared ray in a quantity corresponding to the temperature difference between the surface of the human body as a heat source and the background and determines whether or not the heat source is a human body. For reference, infrared rays with a wavelength of about 10 ì m are emitted from the human body at the highest level and the human body sensor 22 senses the infrared rays at such a wavelength. The operating state (whether or not the sensor 22 senses a human body) of the human body sensor 22 is consecutively detected by a control section (laser beam control device) 23 provided on the liquid crystal projector 2. When the human body sensor 22 senses a human body and operates, the control section 23 transmits a driving stop signal to stop the driving of the laser beam emitting element 52 to the wireless signal receiving section 58 of the laser pointer 5 as a wireless signal. That is, if the human body sensor 22 operates, the laser pointer 5 is controlled not to project a laser beam.

According to this embodiment, the presenter makes a presentation while directing the laser pointer 5 toward the screen 1 onto which a visible image is projected from the liquid crystal projector 2, changing over the mode of the switch 54 to the laser pointer mode to project laser beam, and indicating the visible image by the laser beam. If a person is present around the human body sensor 22 and the sensor operates, then a driving stop signal to stop the driving of the laser beam emitting element 54 is transmitted from the control section 23 to the control section 57 of the laser pointer 5 and no laser beam is projected. It is, therefore, possible to avoid the danger of projecting a laser beam onto an eye in the laser pointer mode.

If a mouse operation is then to be performed, the laser pointer 5 is directed toward the screen 1 and the mode of the switch 54 is changed over to the mouse mode. If so, the infrared light sensing section 21 senses the center of the infrared light emitted from the infrared light emitting section 53 projected onto the screen 1, and the image processing section 3 generates a mouse data based on movement data in accordance with the movement of the laser pointer 5 (mouse operation). The mouse data is supplied to the personal computer 4, the visible image is generated based on the mouse data to supply to the liquid crystal projector 2, and the data is projected onto the screen 1. That is, since the pointer mark according to the movement of the laser pointer 5 is projected onto the screen 1, the presenter adjusts the movement of the pointer mark to a desired location while viewing the mouse image. Furthermore, by performing the same operation as the conventional mouse operation while appropriately depressing the left or right buttons 55 and 56 of the laser pointer 5, it is possible to execute various commands (such as a range designation command, an image scrolling command, and a page turning command) on the visible image.

In the first embodiment, unlike in the conventional systems, it is possible to perform the mouse operation by moving the laser pointer 5 toward the screen 1 and changing the mode switch over to the mouse mode without using the mouse. The presenter can swiftly change the mode to the laser pointer mode or to the mouse mode using the switch 54 of the laser pointer 5. Therefore, restrictions necessitating that the personal computer 4 be disposed near the presenter to perform the mouse operation and that the presenter not be away from the personal computer 4, and the like, do not exist. The freedom of the position and movement of the presenter is thereby improved. It is thus possible to provide a smooth presentation.

Moreover, if a mouse image is to be formed, the infrared light sensing section 21 detects the projected image of infrared light, the image processing section 3 converts only the movement direction or movement distance of the projected image and generates a pointer mark instead of operating the absolute position of the projected image of the infrared light on the screen 1 as coordinates of the infrared light and projecting the pointer mark onto the screen from the operation result. That is, a coordinate of the pointer mark is generated by grasping a projected image of infrared light to the screen 1 relatively, therefore, the program of the image processing section 3 need not complicated, making it possible to minimize cost.

(2) Second Embodiment

Figure 4:
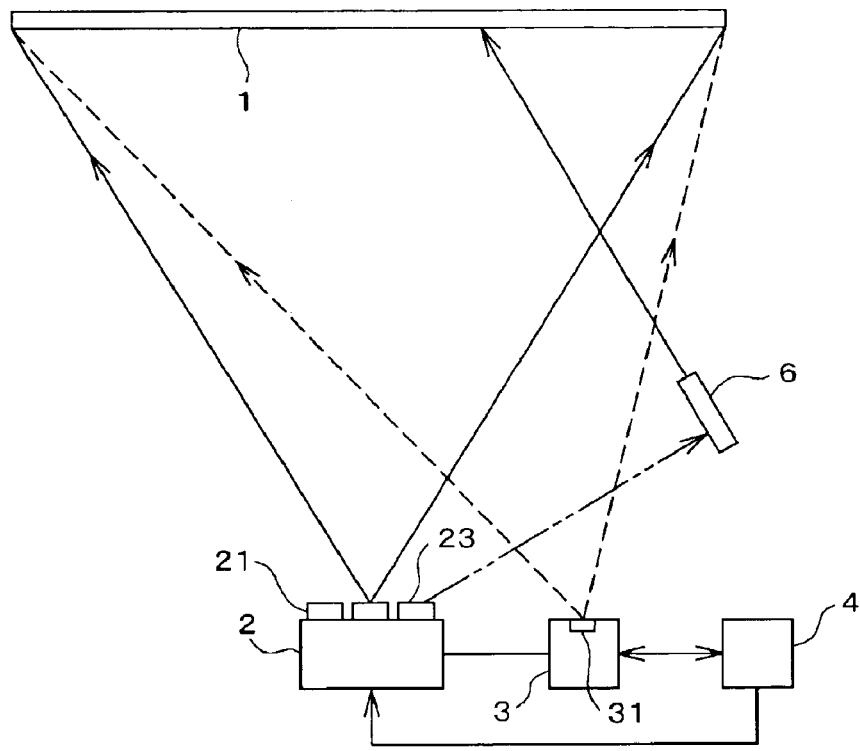
FIG. 4 is a conceptual view of a system in the second embodiment according to the present invention.

FIG. 4 schematically shows the entire system in the second embodiment according to the present invention. The system in the second embodiment includes a screen 1, a liquid crystal projector 2, an image processing section 3, and a personal computer 4, as in the case of the first embodiment. In this embodiment, the system is equipped with an image processing section 3 with an infrared light projection section 31 (infrared light projecting device) projecting infrared light over approximately the entire surface of the screen 1. It is desirable that infrared light be projected from the infrared light projection section 31 and that it be emitted from the infrared light emitting section 53 of the laser pointer 6 have wavelengths different from each other by a certain degree so as to avoid mutual interference and that this be modulated. For example, the wavelength of the infrared light projected from the infrared light projection section may be set at about 850 nm and that of the infrared light emitted from the infrared light emitting section 53 of the laser pointer 6 may be set at about 950 nm. It should be noted that the infrared lights which are emitted from the infrared light emitting section 53 have mutually different wavelengths under moving operation of pointer mark and clicking operation of buttons 55 and 56.

Figure 5:
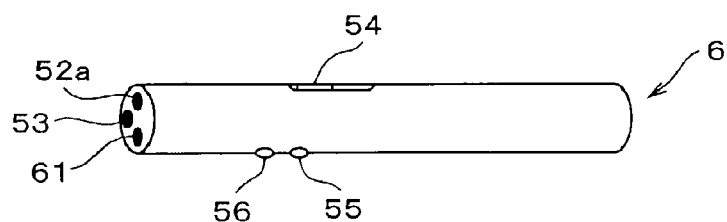
FIG. 5 is a perspective view of a laser pointer in the second embodiment according to the present invention.
Figure 6:
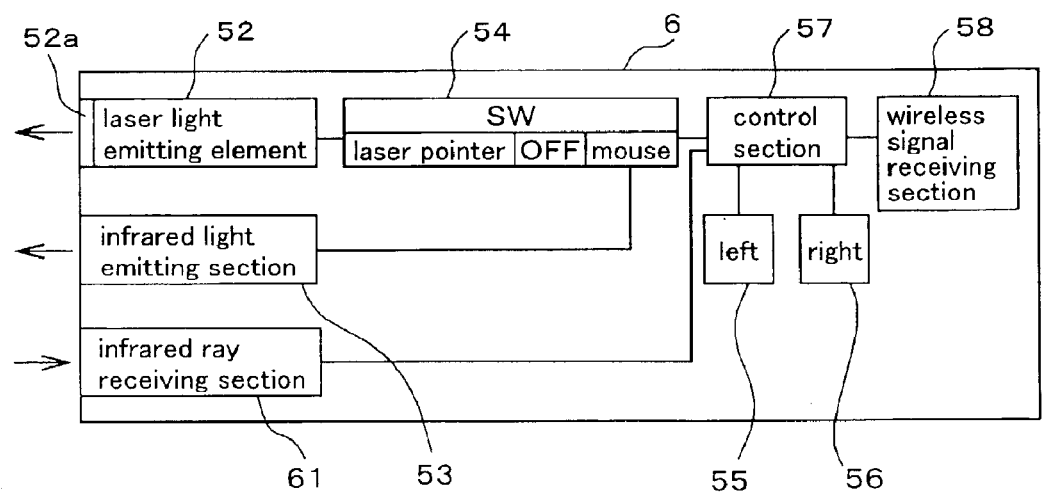
FIG. 6 is a block diagram showing the configuration of the laser pointer in the second embodiment according to the present invention.

FIG. 5 shows the appearance of the laser pointer 6 in the second embodiment, and FIG. 6 is a block diagram showing the configuration of the laser pointer. This laser pointer 6 includes a laser beam emitting element 52 for a laser pointer mode, a laser beam projection section 52*a*, an infrared light emitting section 53 for a mouse mode, and left and right buttons 55 and 56, as in the case of the first embodiment. This laser pointer 6 also includes an infrared light receiving section 61. This infrared light receiving section 61 receives infrared light which is oriented in the same direction as the projection direction of the laser beam from the laser beam projection section 52*a*, projected from the infrared light projection section 31 and reflected by the screen 1. The infrared light projected from the infrared light projection section 31 is reflected by the screen 1, whereby the quantity of infrared light is attenuated. The quantity of the infrared light received by the infrared light receiving section 61 is set to fall within the range of the attenuated quantity of light.

The control section 57 of the laser pointer 6 drives the laser beam emitting element 52 only when the infrared light receiving section 61 receives infrared light while the switch 54 is in the laser pointer mode. If the infrared light receiving section 61 does not receive infrared light, the control section 57 stops driving the laser beam emitting element 52. That is, the control section 57 controls the laser beam projection section 52*a* to project a laser beam from the laser pointer 6 when the infrared light receiving section 61 receives infrared light and to not project a laser beam when the infrared light receiving section 61 does not receive infrared light.

In the second embodiment, the functions of the laser pointer mode and the mouse mode are the same as those in the first embodiment. In the laser pointer mode, the infrared light receiving section 61 receives infrared light reflected by the screen 1 while the laser pointer 6 is directed toward the screen 1. At this time, a laser beam is projected from the laser pointer 6 onto the screen 1. While the direction of the laser pointer 6 is away from the screen 1, the infrared light receiving section 61 does not receive the infrared light reflected by the screen 1 and no laser beam is projected onto the screen 1. That is, a laser beam is projected only when the laser pointer 6 is directed toward the screen 1.

Figure 7:
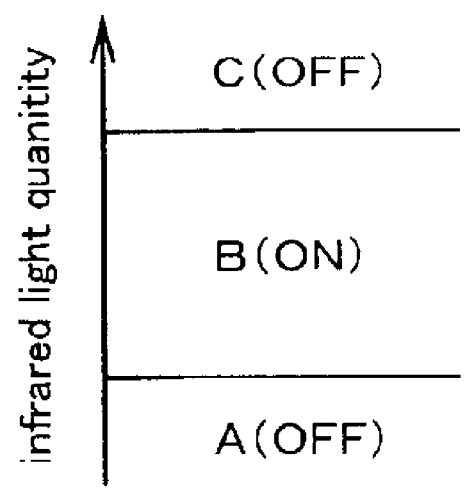
FIG. 7 is a conceptual view of ON/OFF states of the laser pointer according to a range of quantity of infrared light in the second embodiment according to the present invention.

FIG. 7 shows a state in which the projection of a laser beam is turned on and off according to a change in the wavelength of the infrared light reflected from the screen 1. If the laser pointer 6 is directed toward the screen 1 and the infrared light receiving section 61 receives infrared light with wavelengths in a predetermined range (a range B), a laser beam is projected onto the screen 1. If the laser pointer 6 is directed toward the region of the infrared light projected from the infrared light projection section 31 (a range C), no laser beam is projected. If the laser pointer 6 is directed toward a region other than the region of the infrared light reflected from the screen 1 and projected from the infrared light projection section 31 (a range A), no laser beam is projected. It is, therefore, possible to prevent the erroneous projection of the laser beam and thereby safely give a presentation.

As explained up until now, in the present invention, because movement direction and movement distance of a projected image of infrared light which is projected onto the screen device is read as relative movement data against the screen device and a pointer mark is projected onto the screen device based on this movement data, the component required for projection of the pointer mark can be easily and inexpensively realized.

What is claimed is:

1. A presentation system using a laser pointer, comprising:

a screen device;

a projecting device for projecting a visible image generated by a computer onto the screen device; and a laser pointer operated by a user, and projecting a laser beam onto the screen device, the laser pointer comprising:

an infrared light emitting device for emitting an infrared light approximately in the same direction as a projection direction of the laser beam; and a switching device for switching the mode between a laser pointer mode for projecting the laser beam and a mouse mode for emitting the infrared light from the infrared light emitting device, the presentation system further comprising:

an infrared light sensing device for sensing a projected image of the infrared light emitted from the infrared light emitting device to the screen device; and a processing section for generating movement data consisting of a movement direction and a movement distance of the projected image of the infrared light sensed by the infrared light sensing device, and for supplying the movement data to the computer;

wherein a projecting device projects a visible image onto the screen device based on the movement data supplied from the computer.

2. A presentation system using a laser pointer according to claim 1, wherein the system further comprises:

a human body sensor for sensing heat emitted from a human body present in the projection direction of the laser beam from the laser pointer; and a laser beam control device for controlling the projection of the laser beam projected from the laser pointer when the human body sensor operates.

3. A presentation system using a laser pointer according to claim 1, wherein the system further comprises:

an infrared light projecting device for projecting the infrared light over approximately the entire surface of the screen device; and the laser pointer further comprises:

an infrared light receiving section for receiving the infrared light oriented in the same direction as the projection direction of the laser beam, projected from the infrared light projecting device and reflected by the screen device; and a laser beam control device for projecting the laser beam only when the infrared light receiving section receives the infrared light.

* * * * *